Dec. 4, 1956　　　W. M. MEIER ET AL　　　2,773,255
ELECTRONIC DETECTING AND INDICATING SYSTEM
Filed Oct. 27, 1950
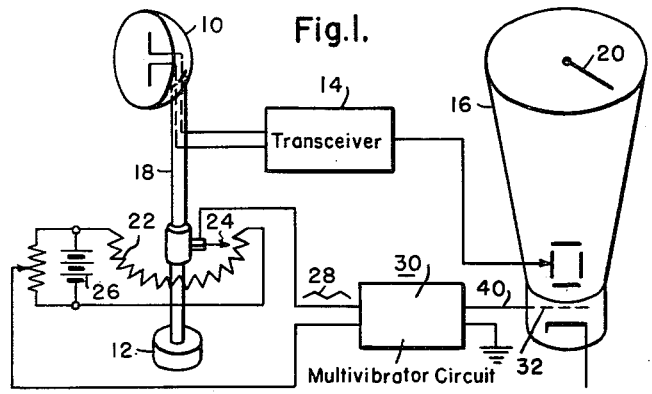
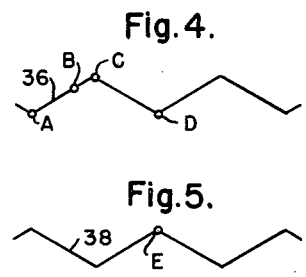
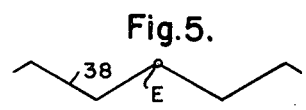
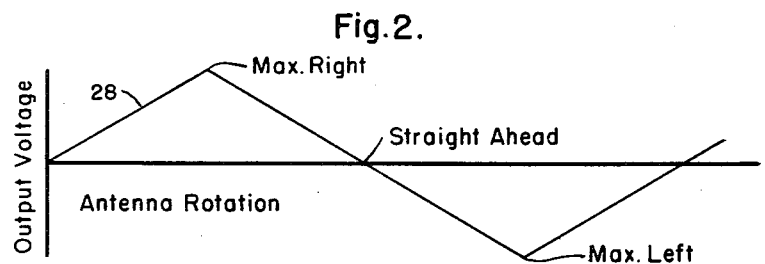
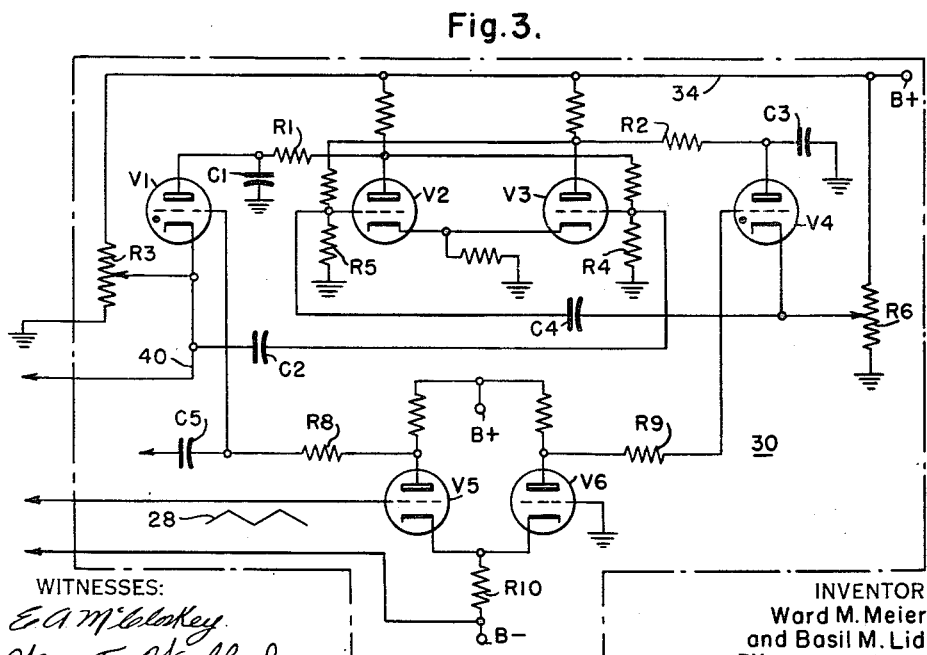
WITNESSES:　　　　　　　　　　　　　INVENTORS
　　　　　　　　　　　　　　　　　　Ward M. Meier
　　　　　　　　　　　　　　　　　and Basil M. Lide.
　　　　　　　　　　　　　　　　　BY
United States Patent Office 2,773,255
Patented Dec. 4, 1956

2,773,255

ELECTRONIC DETECTING AND INDICATING SYSTEM

Ward M. Meier and Basil M. Lide, Baltimore, Md., assignors to Westinghouse Electric Corporation, East Pittsburgh, Pa., a corporation of Pennsylvania Application October 27, 1950, Serial No. 192,506

7 Claims. (Cl. 343—118)

This invention pertains to electronic detecting and indicating systems, and particularly to improvements in systems of this type which utilize a cathode ray indicator.

A primary object of the invention is to provide a system of this type in which the cathode ray trace is so controlled as to provide a normally fixed but adjustable indicating or fiducial mark corresponding to a predetermined point on a repetitious waveform.

A further object is to provide a trigger circuit which may be controlled from a periodic input voltage and which will provide an output pulse only once during each complete cycle of the input voltage.

Another object of the invention is to provide a trigger circuit which may be controlled by an input voltage derived from or in accordance with the movement of the rotating antenna of a radiant energy transmitting and receiving apparatus, and which will provide an output voltage useful in controlling the electron beam of the cathode ray tube indicator of such apparatus to provide an indication of some predetermined orientation of the antenna. In particular, the invention is especially adapted to the production of a lubber line indication upon the indicating scope of vehicular radar systems, the same corresponding to the "straight ahead" position of the directional antenna with reference to the craft or vehicle carrying said antenna.

Still another object of the invention is to provide means for periodically brightening an azimuthal trace of an indicator of the plan-position type, the brightened trace occurring always at the same time phase with respect to a synchronizing voltage wave.

An additional object of the invention is to provide a control circuit for a pulse forming tube, the circuit providing means for firing the pulse tube only when the rising voltage of a control wave reaches a predetermined amplitude, and being operative to prevent a subsequent firing of the pulse tube until the control circuit has been reset by an independent event. This event may, for example, be the attainment of some other phase or amplitude condition by the same control wave.

The above and other objects and advantages of the invention will best be understood by referring to the following detailed specification of a preferred embodiment thereof, taken in connection with the appended drawing, in which:

Fig. 1 is a diagrammatic illustration of a measuring and indicating system employing the invention, Fig. 2 is a graphic representation of a voltage wave corresponding to the movements of the antenna in Fig. 1, Fig. 3 is a schematic diagram of the novel control circuit of the invention, and Figs. 4 and 5 are graphic representations of voltages applied to certain of the vacuum tubes of Fig. 3.

Referring now to Fig. 1 of the drawing, there is illustrated diagrammatically a radiant energy transmitting and receiving system of a type particularly intended for indicating the presence of a reflective object in the path of high frequency radiation emitted from an antenna 10 of a directional type, the said antenna being arranged to scan a region of space by being rotated or oscillated as by a drive 12, for example in a horizontal plane. Associated with antenna 10 is a radio wave transmitter and receiver which may be of any desired or well-known type designated in this figure by numeral 14. This transceiver 14 is arranged in a well-known way so as to furnish pulses of radio frequency energy to antenna 10 which pulses are radiated into space and produce echoes capable of being sensed by antenna 10 and equipment 14 and applied to the control electrodes of an oscilloscope or equivalent indicating instrument 16. As is well known in this art, the indicator 16 may thus be made to display upon its screen an image corresponding to the presence of reflective objects in the region scanned by antenna 10. Preferably, the indicator 16 may be of the plan-position type which displays a polar map of the region scanned by the antenna.

Systems of the type described above are especially useful in the operation and navigation of airplanes, ships or other vehicles or craft. When so installed, however, it would be very desirable for the indication afforded by indicator 16 to include some indication of the "straight ahead" position of the vessel or craft, as this would permit an immediate estimate of the positions of objects sensed by antenna 10 with reference to the axis of the vehicle.

For the purpose of explaining the principles of the present invention, it may be assumed that antenna 10 is arranged to oscillate through 180 degrees about a vertical axis represented by a shaft 18, the antenna travelling from a maximum Right position, through an intermediate position corresponding to the straight ahead direction of the vehicle, and thence to a maximum Left position, and then returning in the opposite direction to complete one cycle of antenna oscillation. In order to provide the relatively fixed angular reference indication on the screen of indicator 16, which indication may take the form of a brightened radial trace such as indicated by numeral 20 in Fig. 1, means are provided for deriving from antenna 10 or from parts associated therewith a voltage which is a function of the instantaneous position of antenna 10 relative to the straight ahead direction of the vehicle.

Such a means is indicated in Fig. 1 as comprising a potentiometer 22 whose movable contact 24 is mounted on or controlled by shaft 18. Purely by way of example, this slider 24 may pick off from potentiometer 22 a portion of the voltage applied thereacross from a current source 26, to provide a controlling voltage 28 which in the case assumed would be a symmetrical sawtooth voltage shown to larger scale in Fig. 2 of the drawing. This voltage is applied to apparatus 30 the output of which is connected to a beam controlling electrode 32 of the indicator 16. In the example chosen for illustration, and in which indicator 16 is of the plan-position type, the desired result will be obtained if the voltage applied to electrode 32 is such as to cause a momentary brightening of one of the radial or diametral scanning traces swept out by the electron beam of such indicator.

Fig. 3 of the drawing shows schematically the arrangement and connection of parts included within the block 30 of Fig. 1, and comprising a pair of amplifier tubes V5 and V6, a pair of grid-controlled gas discharge tubes V1 and V4, and a pair of space discharge devices V2 and V3. The sawtooth voltage 28 derived from potentiometer 22 is applied to the grid of tube V5, the grid of tube V6 being grounded so that the amplified outputs from the anodes or plates of these tubes are 180 degrees out of phase. These out of phase voltages are applied to the grids or control electrodes of gas discharge tubes V1 and V4, respectively, through current limiting resistors R8 and R9, respectively. The anode voltage of tube V1 is applied from positive supply lead 34 through a resistor R1, and a condenser C1 is connected from the anode of V1 to ground. Thus, when tube V1 is rendered conductive under the control of tube V5, condenser C1 is discharged through said tube V1 to form a pulse or voltage at the cathode of tube V1 which is applied through condenser C2 to the grid of tube V3.

Similarly, the anode supply for discharge tube V4 is applied through a resistor R2, and a condenser C3 operates with respect to tube V4 in a manner exactly similar to that just described in connection with condenser C1, the grid or control electrode of tube V4 being controlled by the flow of anode current in tube V6. The pulse formed at the cathode of tube V4 is applied through a condenser C4 to the grid of tube V2. The tubes V2 and V3 are connected in the well-known manner of the Eccles-Jordan trigger circuit, the grid of tube V2 being connected to the anode of tube V3, and the grid of tube V3 being connected to the anode of tube V2. It is a characteristic of this type of interconnection that whenever one of the tubes is cut off, the other is conducting, and the transfer between these alternate states can only be accomplished by the application of an external control or synchronizing voltage.

Assuming for example that tube V2 is in its non-conducting condition and that tube V3 is conducting, the plate voltage applied to the anode of tube V1 will be at its maximum value, and this tube will be rendered conductive (or fired) whenever the control voltage applied to the grid of V1 overcomes the cathode bias set by an adjustable resistor or potentiometer R3. The firing of V1 generates a single positive pulse as C1 discharges, and this pulse is applied to the grid of tube V3 through condenser C2 and across resistor R4. C2 and R4 form a differentiating circuit which renders the pulse applied to the grid of tube V3 effectively negative, driving tube V3 to cut-off and thus rendering tube V2 conductive. After this action has occurred, no further pulses can be generated by tube V1 until the circuit has been reset by the application of a negative pulse from the cathode of tube V4 (via condenser C4 and resistor R5) to tube V2 to render the latter again non-conducting. Tube V4 is controlled from the anode current of tube V6, and the point at which it resets the trigger circuit comprising tubes V2 and V3 is determined by the bias determined by the adjustment of potentiometer R6. The cathodes of tubes V5 and V6 are connected to B— potential source through R10. This causes the plates of V5 and V6 to operate near zero voltage with respect to ground, and prevents a high positive voltage from appearing on the grid of V1.

The action of this circuit will better be understood from a consideration of the voltage curves of Figs. 4 and 5. In Fig. 4, curve 36 represents the voltage applied to the grid of tube V1 from tube V5, while curve 38 of Fig. 5 represents the voltage applied to the grid of tube V4 from the tube V6. It will be observed that these voltages are 180° out of phase with one another. The point B on curve 36 at which V1 fires can be set by adjustment of R3 so that V1 is rendered conductive at any point between points A and C on the rising part of the waveform. Thereafter, assuming that the antenna 10 rotates from left to right during the portion A—C of curve 36, no triggering of tube V1 can occur after point B until the Eccles-Jordan circuit including tubes V2 and V3 has been reset by the firing of tube V4. In the example shown, this point has been established by adjustment of potentiometer R6 so that resetting occurs at point D of curve 36, corresponding to the positive maximum point E of curve 38, and which also corresponds to the maximum left position of the antenna 10.

To recapitulate, as the antenna scans from left to right, tube V1 fires at the point B determined by the setting of R3, and the pulse is applied to tube V3, driving it to cut-off and thereby rendering the tube V2 conductive. Conduction through V2 reduces the anode voltage of tube V1 so that it cannot fire again until the trigger circuit has been reset. The antenna continues its scanning to its maximum right position and then returns. At some point corresponding to D and E on the curves of Figs. 4 and 5, and herein chosen for example as the point at which the antenna reaches its maximum left position, the positive-going voltage from tube V6 overcomes the bias predetermined by the adjustment of R6, tube V4 fires and resets tubes V2 and V3 to the original condition in which V2 is cut off and anode voltage is again applied to tube V1 to "arm" the circuit for another firing at point B.

The voltage applied to the beam controlling electrode 32 of indicator 16 may be derived through an intermediate multivibrator from the voltage pulse generated by tube V1. For example, from a connection 40 to the cathode of tube V1, or from any other desired or convenient point whose voltage is controlled from tube V1, a pulse is taken which is used to trigger a multivibrator. The multivibrator generates a rectangular pulse which is used to brighten the sweep trace of the cathode ray tube.

The circuit described has the additional feature that its triggering function can readily be synchronized with any narrow pulse recurring at a frequency which is high with respect to the frequency of the sawtooth wave applied to the grid of tube V5, by applying the synchronizing pulses as through a coupling condenser C5 so that the pulses are superimposed upon the sawtooth wave applied to the grid of tube V1. This synchronizing pulse may for example be derived from the transmitter 14, in order to cause the brightening of a particular trace of the indicator 16, or a particular portion of such trace.

While the invention has been described in connection with a particular embodiment and application thereof, it is to be understood that such description is by way of example only, and that many changes and modifications may be made in the details of construction and application without departing from the scope of the invention as defined in the appended claims.

We claim as our invention:

1. In combination, a pair of space discharge devices each having at least a cathode, an anode and a control electrode, connections from the anode of each tube to the control electrode of the other to provide a bi-stable multivibrator circuits, a pair of pulse-forming gaseous discharge tubes each connected to the control electrode of an associated space discharge device to drive said devices into non-conducting and conducting states respectively, and means under the control of each space discharge device for disabling the non-associated tube when said device is in a conducting state.

2. The invention in accordance with claim 1, in which said means comprises a connection from the anode of the respective device to said tube, and a resistance in said connection.

3. The invention in accordance with claim 1, in which said means comprises a connection from the anode of the respective device to said tube.

4. A position indicator for a movable member comprising means for deriving a periodic voltage wave having a different magnitude corresponding to each position of said member, a control circuit including a bi-stable multivibrator, first pulse-forming means responsive to a condition of said voltage wave for operating said control circuit to one stable state and for simultaneously disabling said condition responsive means, and second pulse-forming means responsive to a different condition of said voltage wave for operating said control circuit to a different stable state and for simultaneously enabling said first means.

5. In combination, a radio detection and indicating system of the type employing a scanning antenna and an oscilloscopic indicator of the plan position type, means for deriving a periodic voltage wave having a different magnitude corresponding to each scan position of said antenna, and means controlled by said voltage wave for periodically brightening a trace of said indicator corresponding to a predetermined point in the excursion of said antenna, said means controlled by said voltage wave comprising a bi-stable multivibrator circuit, pulse forming means responsive to a condition of said voltage wave for triggering said circuit from a first stable condition to another stable condition at a first predetermined point on said voltage wave, and pulse forming means responsive to a different condition of said voltage wave for restoring said circuit to its original condition at a second predetermined point on said voltage wave.

6. In combination, a pair of space discharge devices each having at least a cathode, an anode, and a control electrode, connections from the node of each device to the control electrode of the other to provide a bi-stable multivibrator, a pair of pulse-forming gaseous discharge tubes, an anode and a cathode for each of said tubes, connections extending from the cathodes of said tubes to the control electrodes of said discharge devices whereby each tube controls conduction in one of said devices, a connection between the anode of each of said tubes and the anode of the discharge device which it does not control, and a pair of capacitors each of which is connected in shunt with an associated discharge tube, each of said capacitors being discharged to thereby render its associated tube inoperative upon conduction of the discharge device which has its anode connected to the anode of the capacitor's associated tube.

7. In combination, a pair of space discharge devices each having at least a cathode, an anode, and a control electrode, connections from the anode of each device to the control electrode of the other to provide a bi-stable multivibrator, a pair of pulse-forming gaseous discharge tubes, a connection between each of said tubes and the control electrode of an associated discharge device for driving the same into non-conducting and conducting states, a connection between the positive terminal of each of said tubes and the anode of its non-associated discharge device, and means connected to the positive terminal of each of said tubes for rendering the same inoperative upon conduction of the tube's non-associated discharge device.

References Cited in the file of this patent

UNITED STATES PATENTS

| | | |
|---|---|---|
| 2,154,492 | Clough | Apr. 18, 1939 |
| 2,272,607 | Higgonet | Feb. 10, 1942 |
| 2,365,512 | Bartelink | Dec. 19, 1944 |
| 2,414,486 | Rieke | Jan. 21, 1947 |
| 2,482,759 | Goodrich et al. | Sept. 27, 1949 |
| 2,495,826 | Schock | Jan. 31, 1950 |
| 2,517,635 | Darden et al. | Aug. 8, 1950 |
| 2,550,116 | Grosdoff | Apr. 24, 1951 |
| 2,576,346 | Johnston | Nov. 27, 1951 |